(12) United States Patent
Keefer et al.

(10) Patent No.: US 6,488,747 B1
(45) Date of Patent: Dec. 3, 2002

(54) PRESSURE SWING ADSORPTION WITH AXIAL OR CENTRIFUGAL COMPRESSION MACHINERY

(75) Inventors: Bowie Gordon Keefer, Vancouver (CA); Denis J. Connor, West Vancouver (CA)

(73) Assignee: QuestAir Technologies, Inc. (CA)

( * ) Notice: Subject to any disclaimer, the term of this patent is extended or adjusted under 35 U.S.C. 154(b) by 0 days.

(21) Appl. No.: 09/591,217

(22) Filed: Jun. 12, 2000

(30) Foreign Application Priority Data

Jun. 10, 1999 (CA) .......................................... 2,274,318

(51) Int. Cl.[7] .............................................. B01D 53/06
(52) U.S. Cl. .............................. 96/125; 96/128; 96/130; 96/150
(58) Field of Search ........................... 96/123, 125–130, 96/143, 144, 150

(56) References Cited

U.S. PATENT DOCUMENTS

| | | | | |
|---|---|---|---|---|
| 2,588,296 A | * | 3/1952 | Russell, Jr. ................. | 96/128 X |
| 3,967,464 A | * | 7/1976 | Cormier et al. ............ | 96/128 X |
| 3,989,478 A | * | 11/1976 | Jones ........................ | 96/128 X |
| 4,530,705 A | * | 7/1985 | Firey ......................... | 96/128 X |
| 4,769,051 A | * | 9/1988 | Defrancesco ................ | 96/128 |
| 4,793,832 A | * | 12/1988 | Veltman et al. ........... | 96/128 X |
| 4,863,497 A | * | 9/1989 | Grenier et al. ............. | 96/123 |
| 5,213,593 A | * | 5/1993 | White, Jr. .................. | 96/126 X |
| 5,256,172 A | * | 10/1993 | Keefer ....................... | 96/125 X |
| 5,298,054 A | * | 3/1994 | Malik ........................ | 96/128 X |
| 5,313,781 A | * | 5/1994 | Toda et al. ................. | 96/130 X |
| 5,403,384 A | * | 4/1995 | Faul et al. .................. | 96/130 X |
| 5,431,716 A | * | 7/1995 | Ebbeson ..................... | 96/125 |
| 6,051,050 A | * | 4/2000 | Keefer et al. .............. | 96/125 X |

FOREIGN PATENT DOCUMENTS

| | | | | |
|---|---|---|---|---|
| JP | 54-146273 | * | 11/1979 | ................. 96/126 |
| SU | 1313495 | * | 5/1987 | ................. 96/128 |

\* cited by examiner

*Primary Examiner*—Robert H. Spitzer
(74) *Attorney, Agent, or Firm*—Katten Muchin Zavis Rosenman

(57) ABSTRACT

A gas separation system for separating a feed gas mixture into a first component of the gas mixture and a second component of the gas mixture includes an adsorbent bed assembly and an axial or centrifugal compression machine. The adsorbent bed assembly includes a number of flow paths for receiving adsorbent material therein for preferentially adsorbing the first gas component in response to increasing pressure in the flow paths in comparison to the second gas component. Each flow path includes a pair of opposite ends and a valve communicating with each opposite end for controlling a flow of the feed gas mixture through the flow paths. Preferably, the compression machine consists of a gas turbine including a number of pressure inlet and outlet ports coupled to the valves for exposing each flow path to a number of different pressures between an upper pressure and a lower pressure for separating the first gas component from the second gas component.

44 Claims, 10 Drawing Sheets

PRESSURE SWING ADSORPTION WITH AXIAL OR CENTRIFUGAL COMPRESSION MACHINERY

FIELD OF THE INVENTION

The present invention relates to an apparatus for separating gas fractions from a gas mixture having multiple gas fractions. In particular, the present invention relates to a gas separation system having a gas turbine for supplying feed gas to adsorbent beds at a number of discrete feed gas pressure levels for implementing a pressure swing adsorption process.

BACKGROUND OF THE INVENTION

Gas separation by pressure swing adsorption (PSA) and vacuum pressure swing adsorption (vacuum-PSA) separate gas fractions from a gas mixture by coordinating pressure cycling and flow reversals over an adsorbent bed which preferentially adsorbs a more readily adsorbed component relative to a less readily adsorbed component of the mixture. The total pressure of the gas mixture in the adsorbent bed is elevated while the gas mixture is flowing through the adsorbent bed from a first end to a second end thereof, and is reduced while the gas mixture is flowing through the adsorbent from the second end back to the first end. As the gas separation cycle is repeated, the less readily adsorbed component is concentrated adjacent the second end of the adsorbent bed, while the more readily adsorbed component is concentrated adjacent the first end of the adsorbent bed. As a result, a "light" product (a gas fraction depleted in the more readily adsorbed component and enriched in the less readily adsorbed component) is delivered from the second end of the bed, and a "heavy" product (a gas fraction enriched in the more strongly adsorbed component) is exhausted from the first end of the bed. However, the conventional PSA and vacuum-PSA is deficient for several reasons.

Firstly, the conventional system for implementing PSA or vacuum-PSA uses two or more stationary adsorbent beds in parallel, with directional valving at each end of each adsorbent bed to connect the beds in alternating sequence to pressure sources and sinks. However, this system is often difficult and expensive to implement due to the complexity of the valving required.

Secondly, the conventional PSA or vacuum-PSA system makes inefficient use of applied energy, because feed gas pressurization is provided by a compressor whose delivery pressure is the highest pressure of the cycle. In PSA, energy expended in compressing the feed gas used for pressurization is then dissipated in throttling over valves over the instantaneous pressure difference between the adsorber and the high pressure supply. Similarly, in vacuum-PSA, where the lower pressure of the cycle is established by a vacuum pump exhausting gas at that pressure, energy is dissipated in throttling over valves during countercurrent blowdown of adsorbers whose pressure is being reduced. A further energy dissipation in both systems occurs in throttling of light reflux gas used for purge, equalization, cocurrent blowdown and product pressurization or backfill steps.

Energy efficiency has been improved in more modern PSA and vacuum-PSA systems, by using feed compressors (or blowers) whose delivery pressure follows the instantaneous pressure of an adsorber being pressurized, and by using vacuum pumps whose suction pressure follows the instantaneous pressure of an adsorber undergoing countercurrent blowdown. In effect, the feed compressor rides each adsorber in turn to pressurize it with reduced throttling losses, and likewise the vacuum pump rides each adsorber in turn to achieve countercurrent blowdown with reduced throttling losses. However, in such systems, each feed compressor can only supply gas to a single adsorber at any time, and each vacuum pump can only exhaust a single adsorber at a time. As a result, the working pressure in each such feed compressor or vacuum pump will undergo large variations, stressing the machinery and causing large fluctuations in overall power demand. Further, compression efficiency is compromised by the unsteady operating conditions.

Thirdly, since centrifugal or axial compression machinery cannot operate under such unsteady conditions, rotary positive displacement machines are typically used. However, such machines have lower efficiency than modern centrifugal compressors working under steady conditions, particularly for larger plant ratings (e.g. 50 tons per day oxygen vacuum-PSA systems). Further, scale up above single train plant capacities of about 80 tons per day oxygen is inhibited by the maximum capacity ratings of single rotary machines.

Lastly, the conventional system for extracting oxygen gas from air by pressure swing adsorption uses nitrogen-selective zeolites as the adsorbent material, such as Na—X, Ca—X, and Ca—A zeolites in the adsorbent beds. More recently, it has been found that low silica X zeolites (LSX) offer superior performance when exchanged with lithium (Li—LSX) or with lithium in combination with divalent or trivalent metal ions. It has also been found in the prior art that lithium exchanged chabazite performs well. However, to provide oxygen generation with favourable performance and efficiency, it has been necessary to conduct the pressure swing adsorption process over a relatively linear portion of the adsorber isotherm and over an operating range which is well below the nitrogen-uptake saturation point of the adsorbers. As a result, the conventional modern industrial tonnage oxygen separation system using lithium exchanged zeolites is operated at moderately sub-atmospheric pressures, requiring the use of expensive vacuum pump and compression machinery.

Accordingly, there remains a need for a gas separation system which is suitable for high volume and high frequency production, while reducing the losses associated with the prior art devices.

SUMMARY OF THE INVENTION

According to the present invention, there is provided a gas separation system which addresses the deficiencies of the prior art systems.

The gas separation system, according to the present invention, uses a pressure-swing adsorption process to separate a gas mixture into a first gas component of the gas mixture and a second gas component of the gas mixture. The gas separation system includes an adsorbent bed assembly having a number of flow paths for receiving adsorbent material therein for preferentially adsorbing the first gas component in response to increasing pressure in the flow paths in comparison to the second gas component. Each flow path includes a pair of opposite ends and a valve communicating with each opposite end for controlling a flow of the feed gas mixture through the flow paths. The gas separation system also includes axial or centrifugal compression machinery having a number of pressure inlet and outlet ports coupled to the valves for exposing each said flow path to a plurality of different pressure levels between an upper pressure and a lower pressure for separating the first gas component from the second gas component.

In a preferred embodiment of the invention, the adsorbent bed assembly includes a stator, and a rotor rotatably coupled to the stator. The stator has a pair of stator valve surfaces and a number of function compartments opening into the stator valve surfaces. The rotor includes a pair of rotor valve surfaces, each rotor valve surface being in communication with a respective one of the stator valve surfaces. The rotor also includes a number of flow paths for receiving adsorbent material therein. The ends of each flow path open into the rotor valve surfaces for communication with the function compartments.

The compression machinery comprises a gas turbine which includes a multi-stage compressor, a multi-stage expander, and a heat source. The compressor includes a number of outlet ports for delivering feed gas to feed gas compartments in the stator at a number of discrete pressure levels. The expander is coupled to the compressor and includes a number of inlet ports for receiving countercurrent blowdown gas from countercurrent blowdown compartments in the stator at a number of discrete pressure levels. A portion of the pressurized feed gas is fed from the compressor to the expander through the heat source so as to increase the speed of operation of the compressor and the expander. As a result, the output pressure and gas flow rate of the compressor is enhanced without resort to expensive electrical switch-gear, electric motors and step-up gearing.

In one implementation, the gas turbine uses a fuel combuster as the heat source, which can be supplied by low cost fuel gas frequently found at industrial sites where PSA oxygen generation or hydrogen purification is required. In another implementation, the compression machinery comprises a number of compressors, a number of expanders, and a heat source, with each compressor delivering feed gas to a feed gas compartment at a respective feed gas pressure level and each expander receiving blowdown gas from the blowdown compartments at a respective blowdown pressure level.

Each pressurization/blowdown compartment is in communication with typically several adsorbers being pressurized/unpressurized (in differing angular and time phase) at any given time. During pressurization and blowdown steps, the several adsorbers passing through each step will converge to the nominal pressure level of that step by a throttling pressure equalization from the pressure level of the previous step experienced by the adsorbers. Preferably the increments between adjacent pressure levels are sized to reduce irreversible throttling losses and to ensure that the gas flows entering or exiting the flow paths are substantially steady in both flow velocity and pressure. Further, gas flow is provided to the adsorbers in a pressurization step or withdrawn in a blowdown step at the nominal pressure level of that step. Hence flow and pressure pulsations seen by the gas turbine at each pressure level are minimal by averaging from the several adsorbers passing through the step, although each adsorber undergoes large cyclic changes of pressure and flow. As a result, the invention can attain favourable efficiency gains and capital cost economies of scale not previously attainable with gas separation systems employing centrifugal or axial compression machinery.

In one implementation of the invention, the adsorbers comprise nitrogen-selective adsorbents such as Ca—X and Li—X. However, due to the high pressure output of the compression machine, the adsorbers are forced to operate at moderately elevated temperature. At high temperatures, saturation in nitrogen uptake is shifted to more elevated pressures, where isotherm nonlinearity is reduced. Therefore, preferably the adsorbers comprise Li—LSX, Ca—LSX, Sr—LSX, Zn—LSX, Ag—LSX, magnesium chabazite, calcium chabazite and strontium chabazite, and combinations thereof such as calcium/silver exchanged LSX.

BRIEF DESCRIPTION OF THE DRAWINGS

The preferred embodiments of the present invention will now be described, by way of example only, with reference to the drawings, in which.

DETAILED DESCRIPTION OF THE PREFERRED EMBODIMENTS

FIGS. 1, 2, 3 and 4

Figure 1:
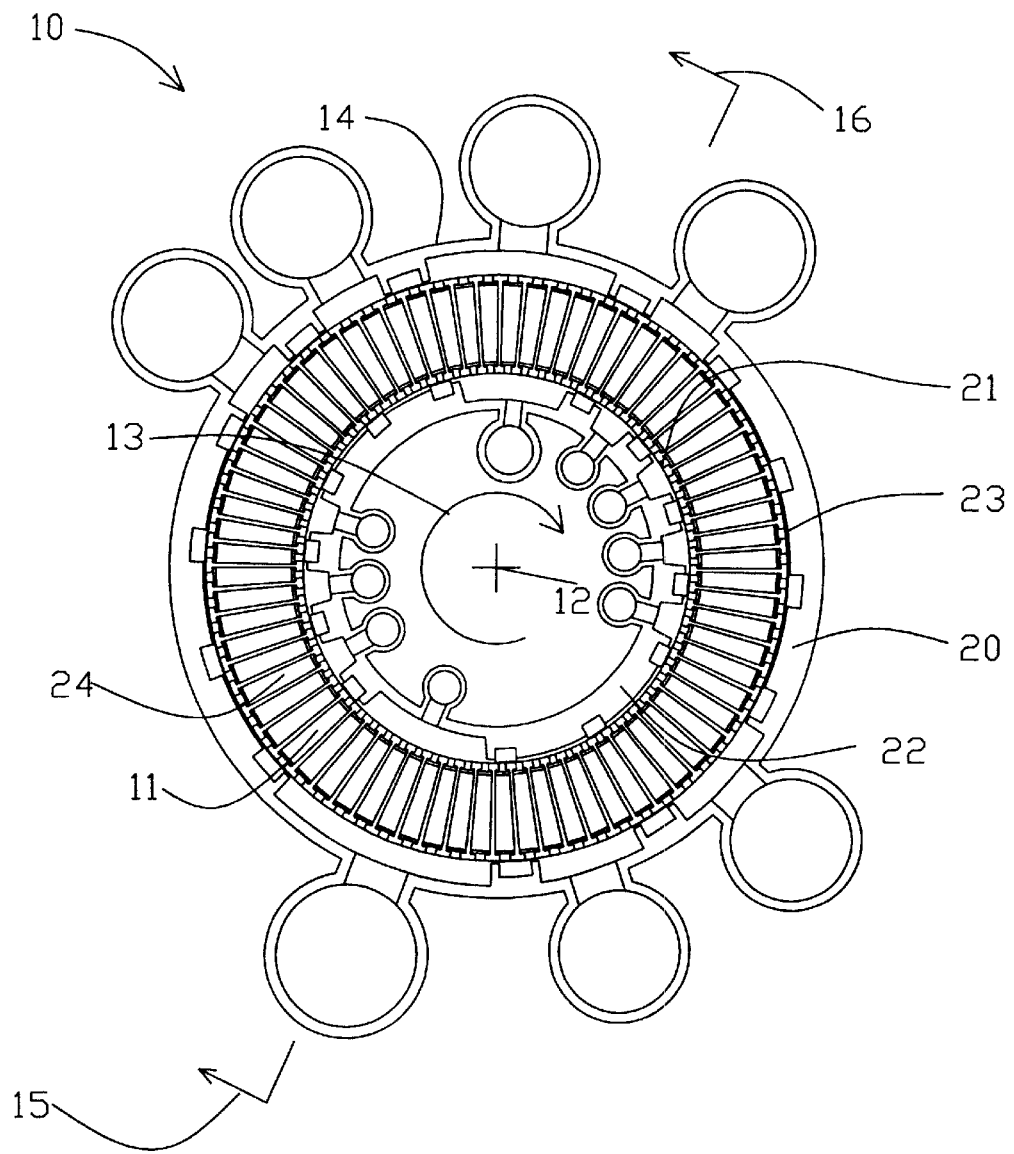
FIG. 1 is a sectional view of a rotary PSA module suitable for use with the present invention, showing the stator and rotor situated in the stator.

A rotary module 10 which is suitable for use as part of the present invention is shown in FIGS. 1, 2, 3 and 4. The module includes a rotor 11 revolving about axis 12 in the direction shown by arrow 13 within stator 14. However, it should be understood that the invention is not limited to PSA systems having rotary modules. Rather other arrangements may be employed without departing from the scope of the invention. For instance, if desired, the present invention may be employed with multiple stationary adsorbent beds in parallel, with directional valving at each end of each adsorbent bed to connect the beds in alternating sequence to pressure sources and sinks.

In general, the rotary module 10 may be configured for flow through the adsorber elements in the radial, axial or oblique conical directions relative to the rotor axis. For operation at high cycle frequency, radial flow has the advantage that the centripetal acceleration will lie parallel to the flow path for most favourable stabilization of buoyancy-driven free convection, as well as centrifugal clamping of granular adsorbent with uniform flow distribution.

Figure 2:
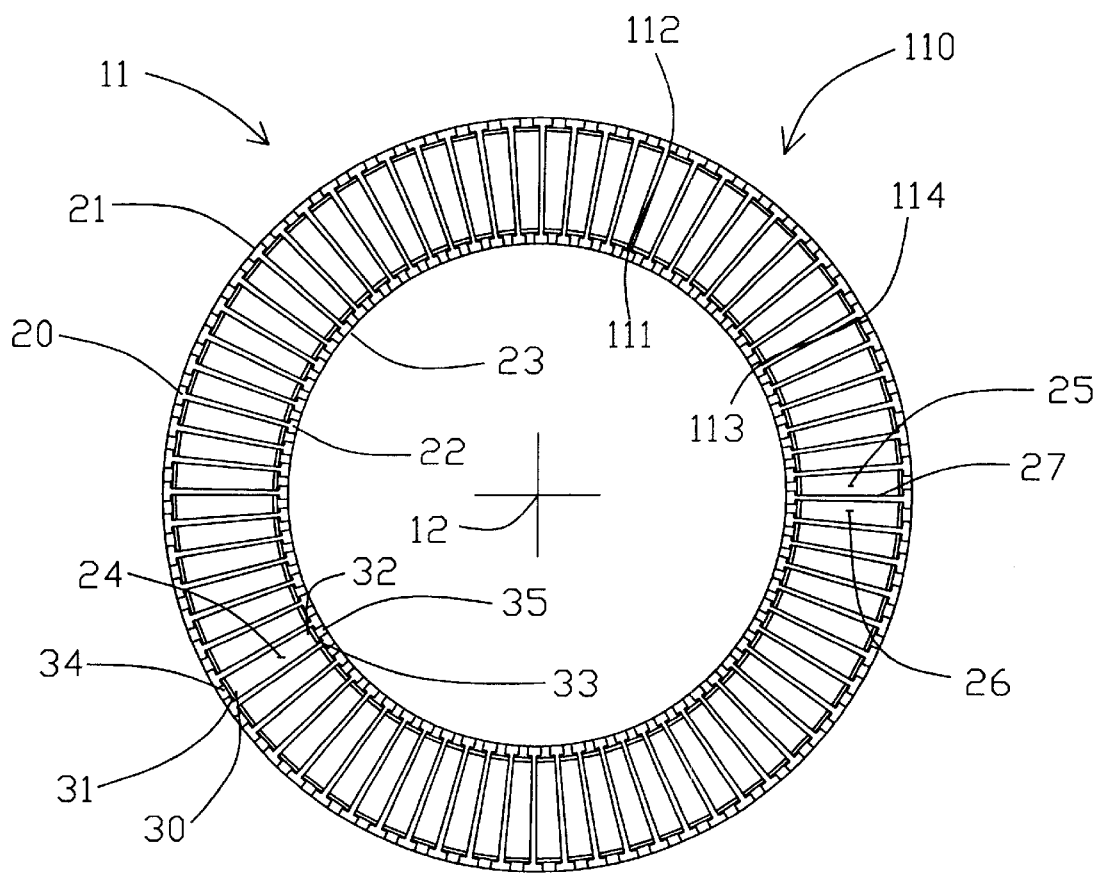
FIG. 2 is a sectional view of the module of FIG. 1, with the stator deleted for clarity.

As shown in FIG. 2, the rotor 11 is of annular section, having concentrically to axis 12 an outer cylindrical wall 20 whose external surface is first valve surface 21, and an inner cylindrical wall 22 whose internal surface is second valve surface 23. The rotor has (in the plane of the section defined by arrows 15 and 16 in FIG. 4) a total of "N" radial flow adsorber elements 24. An adjacent pair of adsorber elements 25 and 26 are separated by partition 27 which is structurally and sealingly joined to outer wall 20 and inner wall 22. Adjacent adsorber elements 25 and 26 are angularly spaced relative to axis 12 by an angle of [360°/N].

Adsorber element 24 has a first end 30 defined by support screen 31 and a second end 32 defined by support screen 33. The adsorber may be provided as granular adsorbent, whose packing voidage defines a flow path contacting the adsorbent between the first and second ends of the adsorber.

First aperture or orifice 34 provides flow communication from first valve surface 21 through wall 20 to the first end 30 of adsorber 24. Second aperture or orifice 35 provides flow communication from second valve surface 23 through wall 22 to the second end 31 of adsorber 24. Support screens 31 and 33 respectively provide flow distribution 32 between first aperture 34 and first end 30, and between second aperture 35 and second end 32, of adsorber element 24. Support screen 31 also supports the centrifugal force loading of the adsorbent.

Figure 3:
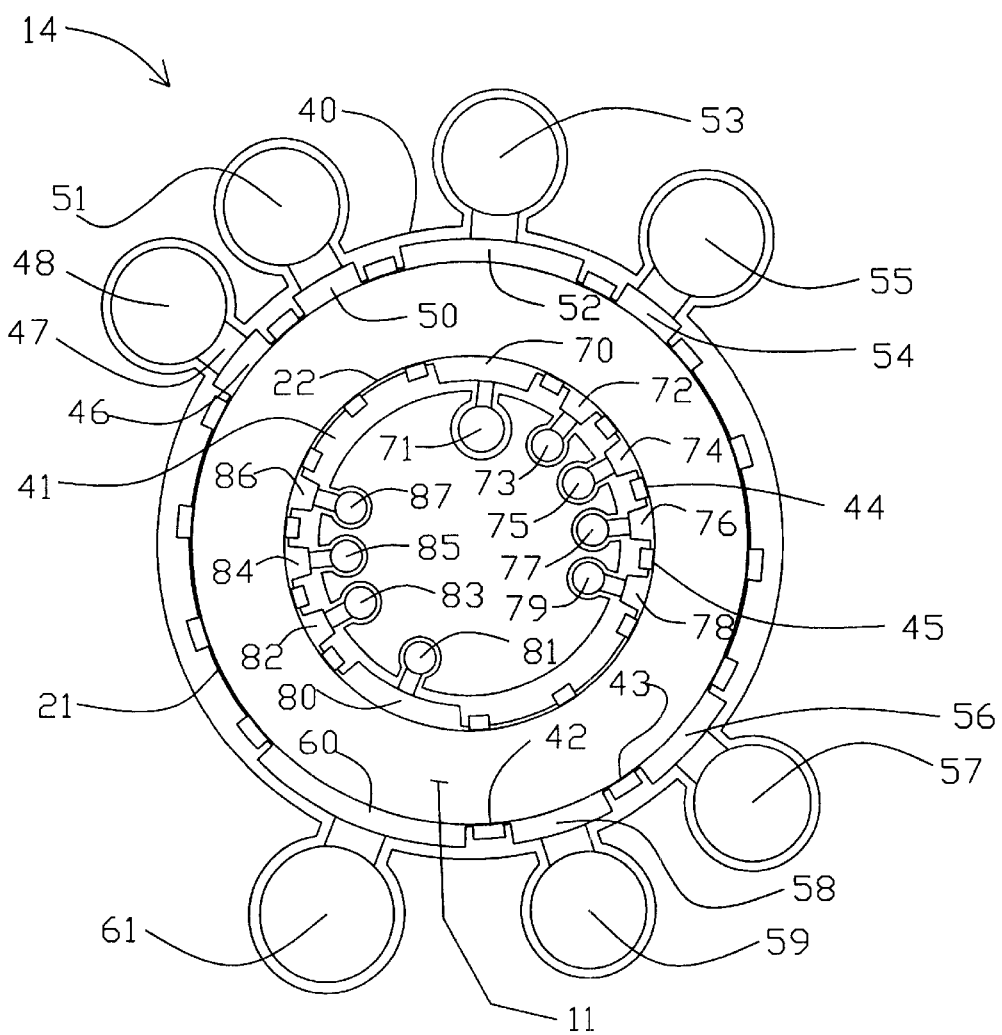
FIG. 3 is a sectional view of the stator shown in FIG. 1, with the rotor deleted for clarity.

As shown in FIG. 3, stator 14 is a pressure housing including an outer cylindrical shell or first valve stator 40 outside the annular rotor 11, and an inner cylindrical shell or second valve stator 41 inside the annular rotor 11. Outer shell 40 carries axially extending strip seals (e.g. 42 and 43) sealingly engaged with first valve surface 21, while inner shell 41 carries axially extending strip seals (e.g. 44 and 45) sealingly engaged with second valve surface 23. The azimuthal sealing width of the strip seals is greater than the diameters or azimuthal widths of the first and second apertures 34 and 35 opening through the first and second valve surfaces.

A set of first compartments in the outer shell each open in an angular sector to the first valve surface, and each provide fluid communication between its angular sector of the first valve surface and a manifold external to the module. The angular sectors of the compartments are much wider than the angular separation of the adsorber elements. The first compartments are separated on the first sealing surface by the strip seals (e.g. 42). Proceeding clockwise in FIG. 3, in the direction of rotor rotation, a first feed pressurization compartment 46 communicates by conduit 47 to first feed pressurization manifold 48, which is maintained at a first intermediate feed pressure. Similarly, a second feed pressurization compartment 50 communicates to second feed pressurization manifold 51, which is maintained at a second intermediate feed pressure higher than the first intermediate feed pressure but less than the higher working pressure.

For greater generality, module 10 is shown with provision for sequential admission of two feed mixtures, the first feed gas having a lower concentration of the more readily adsorbed component relative to the second feed gas. First feed compartment 52 communicates to first feed manifold 53, which is maintained at substantially the higher working pressure. Likewise, second feed compartment 54 communicates to second feed manifold 55, which is maintained at substantially the higher working pressure. A first countercurrent blowdown compartment 56 communicates to first countercurrent blowdown manifold 57, which is maintained at a first countercurrent blowdown intermediate pressure. A second countercurrent blowdown compartment 58 communicates to second countercurrent blowdown manifold 59, which is maintained at a second countercurrent blowdown intermediate pressure above the lower working pressure. A heavy product compartment 60 communicates to heavy product exhaust manifold 61 which is maintained at substantially the lower working pressure. It will be noted that compartment 58 is bounded by strip seals 42 and 43, and similarly all the compartments are bounded and mutually isolated by strip seals.

A set of second compartments in the inner shell each open in an angular sector to the second valve surface, and each provide fluid communication between its angular sector of the second valve surface and a manifold external to the module. The second compartments are separated on the second sealing surface by the strip seals (e.g. 44). Proceeding clockwise in FIG. 3, again in the direction of rotor rotation, light product compartment 70 communicates to light product manifold 71, and receives light product gas at substantially the higher working pressure, less frictional pressure drops through the adsorbers and the first and second orifices. According to the angular extension of compartment 70 relative to compartments 52 and 54, the light product may be obtained only from adsorbers simultaneously receiving the first feed gas from compartment 52, or from adsorbers receiving both the first and second feed gases.

A first light reflux exit compartment 72 communicates to first light reflux exit manifold 73, which is maintained at a first light reflux exit pressure, here substantially the higher working pressure less frictional pressure drops. A first cocurrent blowdown compartment 74 (which is actually the second light reflux exit compartment), communicates to second light reflux exit manifold 75, which is maintained at a first cocurrent blowdown pressure less than the higher working pressure. A second cocurrent blowdown compartment or third light reflux exit compartment 76 communicates to third light reflux exit manifold 77, which is maintained at a second cocurrent blowdown pressure less than the first cocurrent blowdown pressure. A third cocurrent blowdown compartment or fourth light reflux exit compartment 78 communicates to fourth light reflux exit manifold 79, which is maintained at a third cocurrent blowdown pressure less than the second cocurrent blowdown pressure.

A purge compartment 80 communicates to a fourth light reflux return manifold 81, which supplies the fourth light reflux gas which has been expanded from the third cocurrent blowdown pressure to substantially the lower working pressure with an allowance for frictional pressure drops. The ordering of light reflux pressurization steps is inverted from the ordering or light reflux exit or cocurrent blowdown steps, so as to maintain a desirable "last out—first in" stratification of light reflux gas packets. Hence a first light reflux pressurization compartment 82 communicates to a third light reflux return manifold 83, which supplies the third light reflux gas which has been expanded from the second cocurrent blowdown pressure to a first light reflux pressurization pressure greater than the lower working pressure. A second light reflux pressurization compartment 84 communicates to a second light reflux return manifold 85, which supplies the second light reflux gas which has been expanded from the first cocurrent blowdown pressure to a second light reflux pressurization pressure greater than the first light reflux pressurization pressure. Finally, a third light reflux pressurization compartment 86 communicates to a first light reflux return manifold 87, which supplies the first light reflux gas which has been expanded from approximately the higher pressure to a third light reflux pressurization pressure greater than the second light reflux pressurization pressure, and in this example less than the first feed pressurization pressure.

Figure 4:
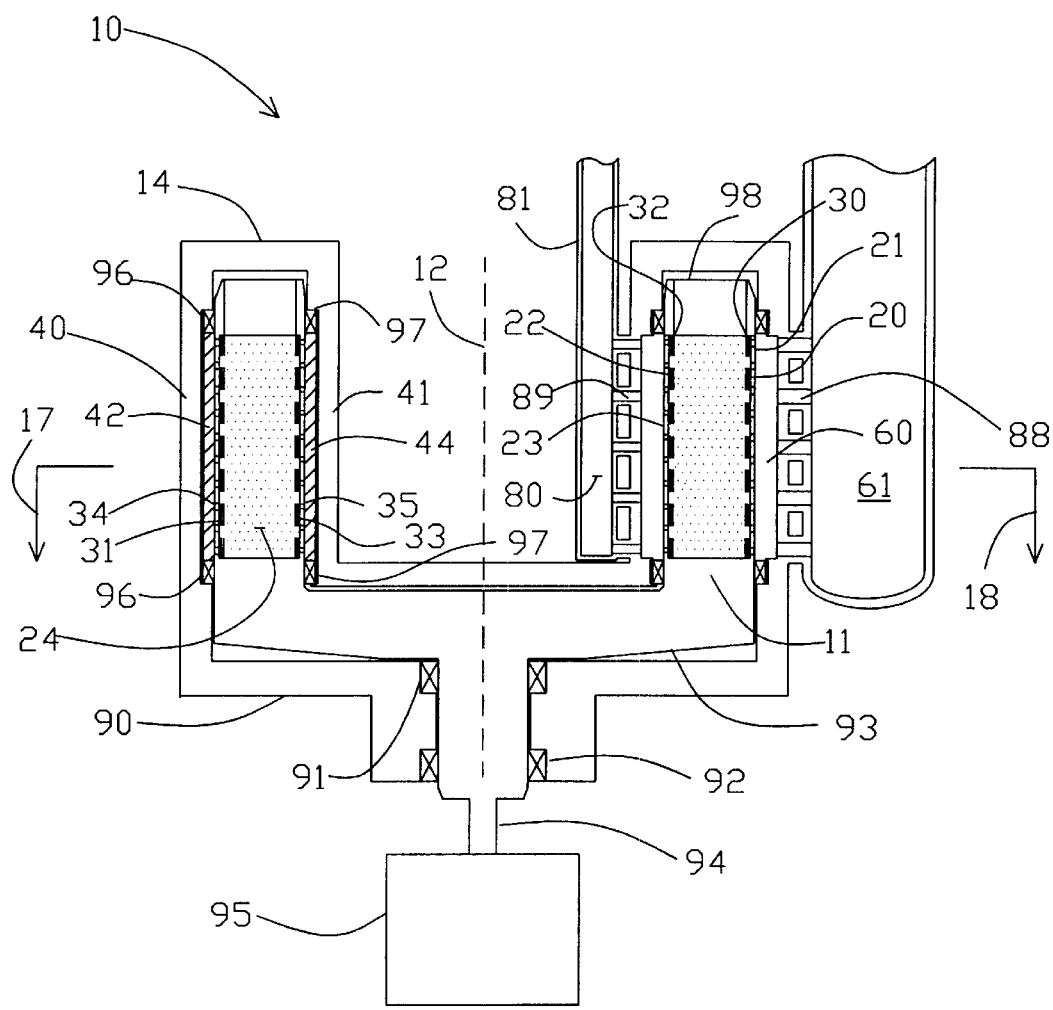
FIG. 4 is an axial section of the module of FIG. 1.

Additional details are shown in FIG. 4. Conduits 88 connect first compartment 60 to manifold 61, with multiple conduits providing for good axial flow distribution in compartment 60. Similarly, conduits 89 connect second compartment 80 to manifold 81. Stator 14 has base 90 with bearings 91 and 92. The annular rotor 11 is supported on end disc 93, whose shaft 94 is supported by bearings 91 and 92. Motor 95 is coupled to shaft 94 to drive rotor 11. The rotor could alternatively rotate as an annular drum, supported by rollers at several angular positions about its rim and also driven at its rim so that no shaft would be required. A rim drive could be provided by a ring gear attached to the rotor, or by a linear electromagnetic motor whose stator would engage an arc of the rim. Outer circumferential seals 96 seal the ends of outer strip seals 42 and the edges of first valve surface 21, while inner circumferential seals 97 seal the ends of inner strip seals 44 and the edges of second valve surface 23. Rotor 11 has access plug 98 between outer wall 20 and inner wall 22, which provides access for installation and removal of the adsorbent in adsorbers 24.

FIG. 5

An attractive alternative to the use of granular adsorbent is obtained by forming the adsorbent material with a suitable reinforcement matrix into thin adsorbent sheets, and layering the adsorbent sheets with spacers to form a layered sheet contactor with flow channels between adjacent pairs of sheets. The adsorber elements may then be installed as angularly spaced rectangular blocks within the rotor and between the first and second valve faces, with the adsorbent sheets as substantially flat sheets extending parallel to the plane defined by the axis of the rotor and a radius from the axis through the rectangular block, and the flat adsorbent sheets being layered with flow channels between them to form the rectangular block. The flow channels also lie in planes parallel to the sheets and to the plane defined by the axis of the rotor and a radius from the axis through the rectangular blocks, and may be configured for either axial flow or radial flow. In the axial flow case, the first and second valve surfaces would be provided as flat discs perpendicular to and concentric with the axis of rotation. In the radial flow case, represented by FIGS. 1–4, the first and second valve surfaces are provided as inner and outer cylindrical surfaces bounding the annular rotor within which the adsorber elements are mounted.

Figure 5:
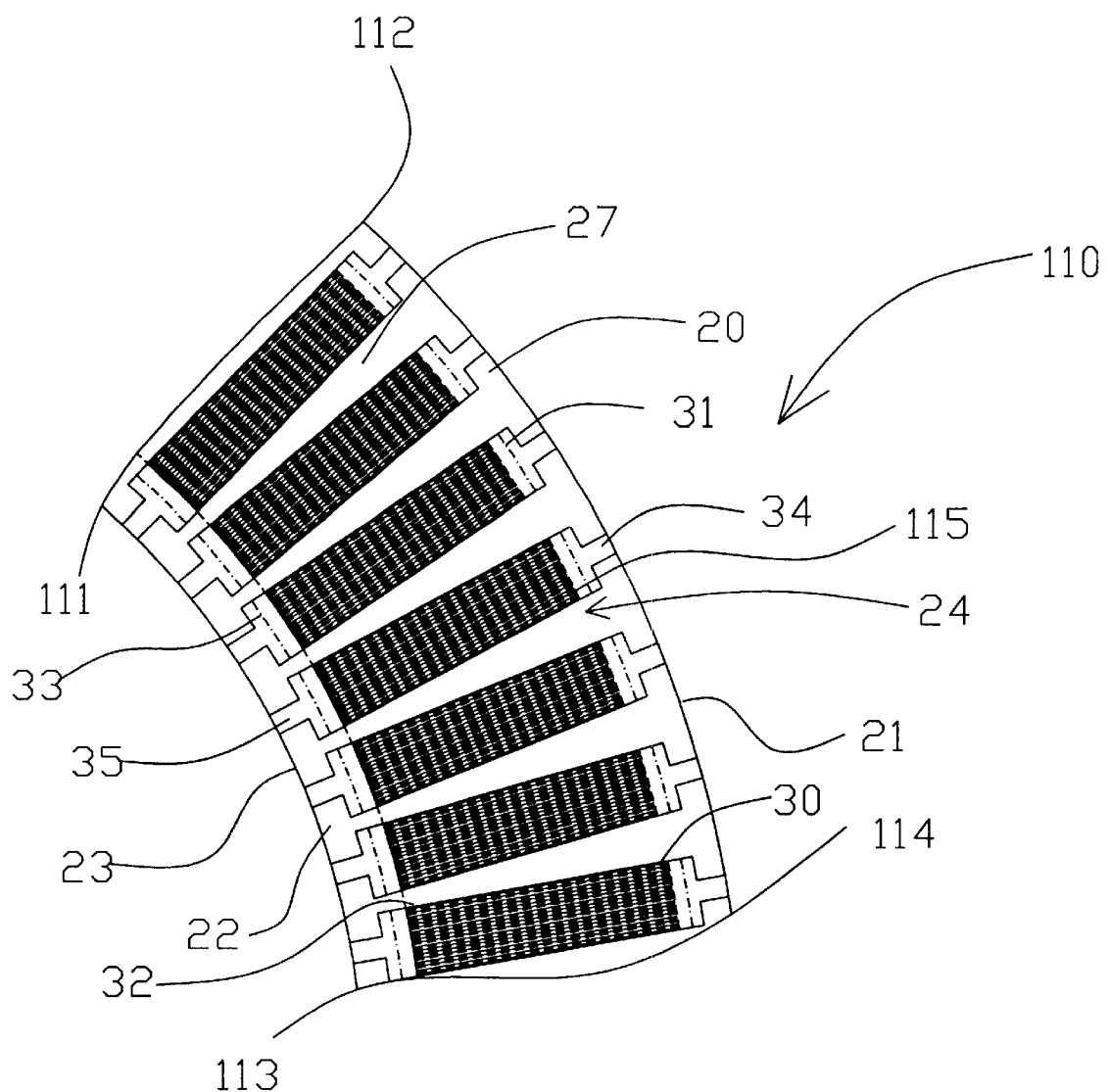
FIG. 5 shows an adsorber configuration using layered adsorbent sheets, suitable for use with the present invention.

A section 110 of rotor 11 has been identified in FIG. 2 between the curved lines with endpoints 111 and 112, and 113 and 114. FIG. 5 shows section 110 in detail, with the laminated sheet embodiment of the adsorbers.

The laminate sheets 115 lie in the radial plane and are layered to form the adsorber elements 24 as rectangular blocks. Each sheet 115 comprises reinforcement material, e.g. a glass fiber or metal wire matrix (woven or non-woven) on which the adsorbent material (e.g. zeolite crystallites is supported by a suitable binder (e.g., clay, silicate or coke binders). Typical thickness of an adsorbent sheet may be about 100 microns. The sheets 115 are installed with spacers on one or both sides to establish flow channels between adjacent pairs of sheets. The flow channels define the flow path approximately in the radial direction between first end 30 and second end 32 of the flow path in each adsorber element. Typical channel height would be about 50% to 100% of the adsorbent sheet thickness.

The adsorbent sheets comprise a reinforcement material, preferably glass fibre, but alternatively metal foil or wire mesh, to which the adsorbent material is attached with a suitable binder. For air separation to produce enriched oxygen, typical adsorbents are X, A or chabazite type zeolites, typically exchanged with calcium or lithium cations. The zeolite crystals are bound with silica, clay and other binders within the adsorbent sheet matrix.

Satisfactory adsorbent sheets have been made by coating a slurry of zeolite crystals with binder constituents onto the reinforcement material, with successful examples including non-woven fiber glass scrims, woven metal fabrics, and expanded aluminum foils. Spacers are provided by printing or embossing the adsorbent sheet with a raised pattern, or by placing a fabricated spacer between adjacent pairs of adsorbent sheets. Alternative satisfactory spacers have been provided as woven metal screens, fiber glass scrims, and metal foils with etched flow channels in a photolithographic pattern.

Typical experimental sheet thicknesses have been 150 microns, with spacer heights in the range of 100 to 150 microns, and adsorber flow channel length approximately 20 cm. Using X type zeolites, excellent performance has been achieved in oxygen separation from air at PSA cycle frequencies in the range of 50 to 100 cycles per minute.

Figure 6:
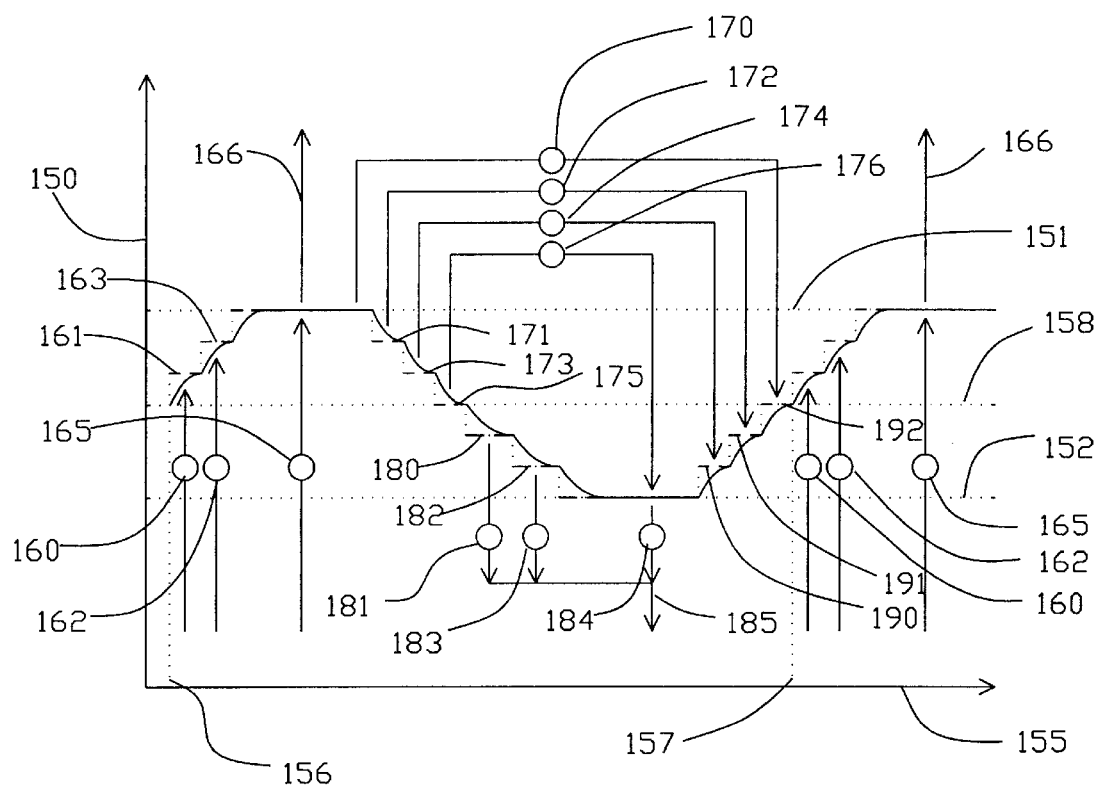
FIG. 6 shows a typical PSA cycle attainable with the present invention.
Figure 7:
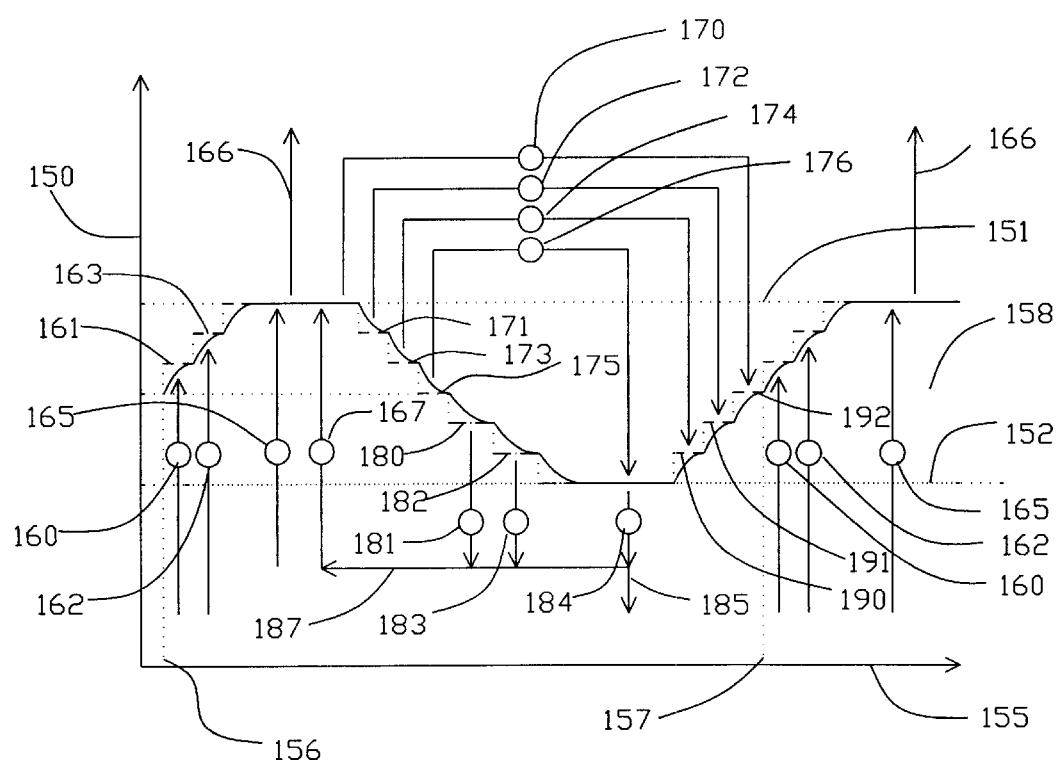
FIG. 7 shows one variation of the PSA cycle with heavy reflux, attainable with the present invention.

FIGS. 6 and 7

FIG. 6 shows a typical PSA cycle which would be obtained using the gas separation system according to the invention, while FIG. 7 shows a similar PSA cycle with heavy reflux recompression of a portion of the first product gas to provide a second feed gas to the process.

In FIGS. 6 and 7, the vertical axis 150 indicates the working pressure in the adsorbers and the pressures in the first and second compartments. Pressure drops due to flow within the adsorber elements are neglected. The higher and lower working pressures are respectively indicated by dotted lines 151 and 152.

The horizontal axis 155 of FIGS. 6 and 7 indicates time, with the PSA cycle period defined by the time interval between points 156 and 157. At times 156 and 157, the working pressure in a particular adsorber is pressure 158. Starting from time 156, the cycle for a particular adsorber (e.g. 24) begins as the first aperture 34 of that adsorber is opened to the first feed pressurization compartment 46, which is fed by first feed supply means 160 at the first intermediate feed pressure 161. The pressure in that adsorber rises from pressure 158 at time 157 to the first intermediate feed pressure 161. Proceeding ahead, first aperture passes over a seal strip, first closing adsorber 24 to compartment 46 and then opening it to second feed pressurization compartment 50 which is fed by second feed supply means 162 at the second intermediate feed pressure 163. The adsorber pressure rises to the second intermediate feed pressure.

First aperture 34 of adsorber 24 is opened next to first feed compartment 52, which is maintained at substantially the higher pressure by a third feed supply means 165. Once the adsorber pressure has risen to substantially the higher working pressure, its second aperture 35 (which has been closed to all second compartments since time 156) opens to light product compartment 70 and delivers light product 166.

In the cycle of FIG. 7, first aperture 34 of adsorber 24 is opened next to second feed compartment 54, also maintained at substantially the higher pressure by a fourth feed supply means 167. In general, the fourth feed supply means supplies a second feed gas, typically richer in the more readily adsorbed component than the first feed gas provided by the first, second and third feed supply means. In the specific cycle illustrated in FIG. 7, the fourth feed supply means 167 is a "heavy reflux" compressor, recompressing a portion of the heavy product back into the apparatus. In the cycle illustrated in FIG. 6, there is no fourth feed supply means, and compartment 54 could be eliminated or consolidated with compartment 52 extended over a wider angular arc of the stator.

While feed gas is still being supplied to the first end of adsorber 24 from either compartment 52 or 54, the second end of adsorber 24 is closed to light product compartment 70 and opens to first light reflux exit compartment 72 while delivering "light reflux" gas (enriched in the less readily adsorbed component, similar to second product gas) to first light reflux pressure let-down means (or expander) 170. The first aperture 34 of adsorber 24 is then closed to all first compartments, while the second aperture 35 is opened successively to (a) second light reflux exit compartment 74, dropping the adsorber pressure to the first cocurrent blowdown pressure 171 while delivering light reflux gas to second light reflux pressure letdown means 172, (b) third light reflux exit compartment 76, dropping the adsorber pressure to the second cocurrent blowdown pressure 173 while delivering light reflux gas to third light reflux pressure letdown means 174, and (c) fourth light reflux exit compartment 78, dropping the adsorber pressure to the third cocurrent blowdown pressure 175 while delivering light reflux gas to fourth light reflux pressure letdown means 176. Second aperture 35 is then closed for an interval, until the light reflux return steps following the countercurrent blowdown steps.

The light reflux pressure let-down means may be mechanical expanders or expansion stages for expansion energy recovery, or may be restrictor orifices or throttle valves for irreversible pressure let-down.

Either when the second aperture is closed after the final light reflux exit step (as shown in FIGS. 6 and 7), or earlier while light reflux exit steps are still underway, first aperture 34 is opened to first countercurrent blowdown compartment 56, dropping the adsorber pressure to the first countercurrent blowdown intermediate pressure 180 while releasing "heavy" gas (enriched in the more strongly adsorbed component) to first exhaust means 181. Then, first aperture 34 is opened to second countercurrent blowdown compartment 58, dropping the adsorber pressure to the first countercurrent blowdown intermediate pressure 182 while releasing heavy gas to second exhaust means 183. Finally reaching the lower working pressure, first aperture 34 is opened to heavy product compartment 60, dropping the adsorber pressure to the lower pressure 152 while releasing heavy gas to third exhaust means 184. Once the adsorber pressure has substantially reached the lower pressure while first aperture 34 is open to compartment 60, the second aperture 35 opens to purge compartment 80, which receives fourth light reflux gas from fourth light reflux pressure let-down means 176 in order to displace more heavy gas into first product compartment 60.

In FIG. 6, the heavy gas from the first, second and third exhaust means is delivered as the heavy product 185. In FIG. 7, this gas is partly released as the heavy product 185, while the balance is redirected as "heavy reflux" 187 to the heavy reflux compressor as fourth feed supply means 167. Just as light reflux enables an approach to high purity of the less readily adsorbed ("light") component in the light product, heavy reflux enables an approach to high purity of the more readily adsorbed ("heavy") component in the heavy product.

The adsorber is then repressurized by light reflux gas after the first and second apertures close to compartments 60 and 80. In succession, while the first aperture 34 remains closed at least initially, (a) the second aperture 35 is opened to first light reflux pressurization compartment 82 to raise the adsorber pressure to the first light reflux pressurization pressure 190 while receiving third light reflux gas from the third light reflux pressure letdown means 174, (b) the second aperture 35 is opened to second light reflux pressurization compartment 84 to raise the adsorber pressure to the second light reflux pressurization pressure 191 while receiving second light reflux gas from the second light reflux pressure letdown means 172, and (c) the second aperture 35 is opened to third light reflux pressurization compartment 86 to raise the adsorber pressure to the third light reflux pressurization pressure 192 while receiving first light reflux gas from the first light reflux pressure letdown means 170. Unless feed pressurization has already been started while light reflux return for light reflux pressurization is still underway, the process (as based on FIGS. 6 and 7) begins feed pressurization for the next cycle after time 157 as soon as the third light reflux pressurization step has been concluded.

The pressure variation waveform in each adsorber would be a rectangular staircase if there were no throttling in the first and second valves. In order to provide balanced performance of the adsorbers, preferably all of the apertures are closely identical to each other.

The rate of pressure change in each pressurization or blowdown step will be restricted by throttling in ports (or in clearance or labyrinth sealing gaps) of the first and second valve means, or by throttling in the apertures at first and second ends of the adsorbers, resulting in the typical pressure waveform depicted in FIGS. 6 and 7. Alternatively, the apertures may be opened slowly by the seal strips, to provide flow restriction throttling between the apertures and the seal strips, which may have a serrated edge (e.g. with notches or tapered slits in the edge of the seal strip) so that the apertures are only opened to full flow gradually. Excessively rapid rates of pressure change would subject the adsorber to mechanical stress, while also causing flow transients which would tend to increase axial dispersion of the concentration wavefront in the adsorber. Pulsations of flow and pressure are minimized by having a plurality of adsorbers simultaneously transiting each step of the cycle, and by providing enough volume in the function compartments and associated manifolds so that they act effectively as surge absorbers between the compression machinery and the first and second valve means.

It will be evident that the cycle could be generalized by having more or fewer intermediate stages in each major step of feed pressurization, countercurrent blowdown exhaust, or light reflux. Furthermore, in air separation or air purification applications, a stage of feed pressurization (typically the first stage) could be performed by equalization with atmosphere as an intermediate pressure of the cycle. Similarly, a stage of countercurrent blowdown could be performed by equalization with atmosphere as an intermediate pressure of the cycle.

FIG. 8

Figure 8:
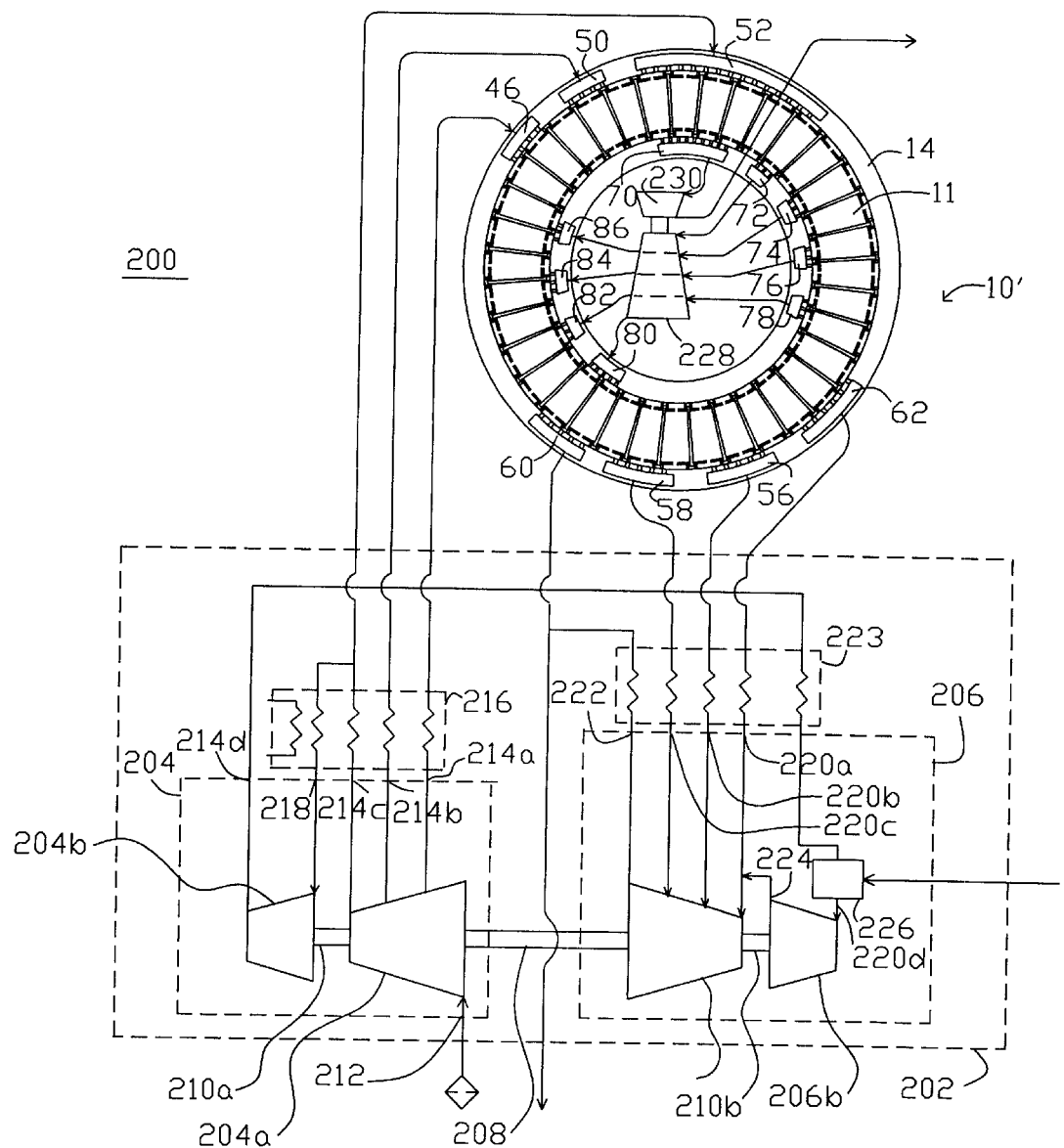
FIG. 8 is a schematic view of a first embodiment of the gas separation system according to the present invention, depicting the rotary module shown in FIG. 1, and the axial or centrifugal multi-stage compressor and multi-stage expander of the compression machine.

A gas separation system 200, according to a first embodiment of the present invention, is shown in FIG. 8. The gas separation system 200 receives air at atmospheric pressure as the feed gas mixture, and employs nitrogen-selective zeolite adsorbents for extracting oxygen gas from the feed gas mixture as the light product gas and exhausting nitrogen-rich moist waste gas as the heavy product gas. The PSA lower pressure 152 is nominally atmospheric pressure.

The gas separation system 200 comprises a rotary module 10', and compression machinery 202 coupled to the rotary module 10' for exposing each of the adsorbent bed flow paths to a plurality of different pressure levels between the upper PSA pressure 151 and the lower PSA pressure 152 as the rotor 11 rotates. The rotary module 10' is substantially identical to the rotary module 10 shown in FIGS. 1 to 4, with the exception of an additional countercurrent blowdown compartment 62 in the stator 14 which is maintained at a pressure level greater than the first countercurrent blowdown compartment 56. However, it should be understood that the additional blowdown compartment 56 is not essential, and that the rotary module 10' may include a greater or few number of pressurization and blowdown compartments than that shown in FIG. 8.

The compression machinery 202 comprises a gas turbine, which in the embodiment shown in FIG. 8, includes a multi-stage compressor assembly 204, and a multi-stage expander assembly 206 coupled to the first multi-stage compressor assembly 204 through a common shaft 208. The multi-stage compressor 204 comprises a multi-stage first compressor 204a, and a second compressor 204b coupled to the first compressor 204a through a first auxiliary shaft 210a. The first and second compressors 204a, 204b may comprise either axial or centrifugal compressors. The first compressor 204a includes a feed gas inlet port 212 for receiving a feed gas mixture, and a plurality of pressure outlet ports 214 coupled to the gas feed compartments 46, 50, 52 for delivering the feed gas mixture to the flow paths at a plurality of different pressure levels. Preferably, the compression machine 202 includes an intercooler 216 disposed between the pressure outlet ports 214 and the gas feed compartments 46, 50, 52 for increasing the density of the feed gas delivered by the first compressor 204a so as to decrease the input power required to drive the multi-stage compressor assembly 204.

Each of the pressure outlet ports 214 of the first compressor 204a are coupled to a respective one of the gas feed compartments 46, 50, 52, with the feed gas emanating from the third pressure outlet port 214c at the upper pressure level 151. In addition, the feed gas emanates from the second pressure outlet port 214b at a pressure level less than the upper pressure level 151, and the feed gas emanates from the first pressure outlet port 214a at a pressure level less than the pressure of the feed gas emanating from the second pressure outlet port 214b. As will be appreciated, the first compressor 204a may include a greater or fewer number of pressure outlet ports 214 than that shown in FIG. 8. Further, in one variation (not shown), the multi-stage compressor assembly 204 comprises a plurality of compressors, with each compressor delivering the feed gas mixture to a respective gas feed compartment 46, 50, 52 at a respective feed gas pressure level.

The second compressor 204b includes a second feed gas inlet port 218 coupled to the third pressure outlet port 214c for receiving a portion of the feed gas emanating from the third pressure outlet port 214c. The second compressor 204b also includes a fourth pressure outlet port 214d. The feed gas emanates from the fourth pressure outlet port 214d at a pressure level greater than the pressure of the feed gas emanating from the third pressure outlet port 214c. Accordingly, the feed gas emanates from the fourth pressure outlet port 214d at the highest output pressure produced by the multi-stage compressor assembly 204. However, the feed gas may emanate from the fourth pressure outlet port 214d at a reduced pressure level if desired. Further, the first and second compressors 204a, 204b may be integrated into a single multi-stage compressor without departing from the scope of the invention.

The multi-stage expander assembly 206 comprises a multi-stage first expander 206a, and a second expander 206b coupled to the first expander 206a through a second auxiliary shaft 210b. The first and second expanders 206a, 206b may comprise either axial or centrifugal expanders. The first expander 206a includes a plurality of pressure inlet ports 220 coupled to the countercurrent blowdown compartments 62, 56, 58 for receiving countercurrent blowdown gas from the flow paths at a plurality of different superatmospheric pressure levels, and a first gas outlet port 222 coupled to the heavy product compartment 60 for exhausting heavy product gas from the rotary module 10' at the lower PSA pressure level 152. Preferably, the compression machine 202 also includes a heater 223 disposed between the pressure inlet ports 220 and the countercurrent blowdown compartments 62, 56, 58 for reducing the density of the countercurrent blowdown gas received by the first expander 206a so as to decrease the input power required to drive the multi-stage expander assembly 206.

Each of the pressure inlet ports 220 of the first expander 206a are coupled to a respective one of the countercurrent blowdown compartments 62, 56, 58 with the countercurrent blowdown gas received at the first pressure inlet port 220a at a pressure level greater than the pressure level of the countercurrent blowdown gas received at the second pressure inlet port 220b, and the countercurrent blowdown gas received at the second pressure inlet port 220b at a pressure level greater than the pressure level of the countercurrent blowdown gas received at the third pressure inlet port 220c. As will be appreciated, the first expander 206a may include a greater or fewer number of pressure inlet ports 220 than that shown in FIG. 8. Further, in one variation (not shown), the multi-stage expander assembly 206 comprises a plurality of expanders, with each expander receiving the blowdown gas from a respective countercurrent blowdown compartment 62, 56, 58 at a respective blowdown gas pressure level.

The second expander 206b includes a fourth pressure inlet port 220d coupled to the fourth pressure outlet port 214d of the second compressor 204b, and a second gas outlet port 224 coupled to the first pressure inlet port 220a for delivering feed gas at high pressure to the first pressure inlet port 220a. The compression machine 202 also includes a heater 226 coupled between the fourth pressure outlet 214d of the multi-stage compressor assembly 204 and the fourth pressure inlet 220d of the multi-stage expander assembly 206 for increasing the pressure of the feed gas delivered to the fourth pressure inlet port 220d. Preferably, the heater 226 comprises a fuel combuster supplied by low cost fuel gas. However, the heater 226 may comprise an electrically-powered heater if desired.

The feed gas is received at the fourth pressure inlet port 220d at a pressure level greater than the pressure of the cocurrent blowdown gas received at the first pressure inlet port 220a. Accordingly, the feed gas is received at the fourth pressure inlet port 220d at the highest output pressure input to the multi-stage compressor assembly 204. However, the feed gas may be received at the fourth pressure inlet port 220d at a reduced pressure level if desired. Further, the first and second expander 206a, 206b may be integrated into a single multi-stage expander without departing from the scope of the invention.

The gas separation system 200 includes a light reflux expander 228 disposed within the stator 14 for pressure let-down with energy recovery. However, in one variation (not shown) where high energy efficiency is not of highest importance, the light reflux expander 228 is replaced with restrictor orifices or throttle valves for pressure let-down.

The light reflux expander 228 is coupled between the first light reflux exit compartments (cocurrent blowdown compartments) 72, 74, 76, 78 and the light reflux return compartments 80, 82, 84, 86. The light reflux expander 228 receives separate flows of light reflux gas at a plurality of discrete pressure levels from the light reflux exit compartments 72, 74, 76, 78 and delivers each light reflux gas flow after pressure let-down to a respective one of the light reflux return compartments 80, 82, 84, 86. The gas separation system 200 also includes a light product compressor 230 driven by the light reflux expander 228. The light product compressor 230 is coupled to the light product compartment 70 and boosts the delivery pressure of light product gas received from the light product compartment 70.

In operation, the rotor 11 is rotated and the compression 202 receives air at the feed gas inlet port 212. Initially, the compression machine 202 is powered by an electric motor (not shown) or other suitable prime mover. The electric motor rotates the multi-stage compressor assembly 204 until a minimum speed is achieved which delivers feed gas from the second compressor 204b to the second expander 206b at a pressure level sufficient to cause acceleration in the speed of rotation of the common shaft 208 and the first compressor 204a. Thereafter, the electric motor can be uncoupled from the multi-stage compressor assembly 204.

The heater 226 is also activated so as to heat the feed gas from the fourth pressure outlet port 214d prior to reception at the fourth pressure inlet port 220d of the multi-stage expander assembly 206. As a result, the speed of rotation of the common shaft 208, and the first expander 206a and the first compressor 204a is further increased. The speed of rotation of the first compressor 204a and the first expander 206a increase until a steady state condition is reached at which the rate of gas flow delivered by the first compressor 204a and the rate of gas flow exhausted by the first expander 206a reaches the maximum gas flow rate through the rotor 11 at the rotational frequency of the rotor 11.

Once the compression machine 202 is functioning, it delivers feed gas to the rotary module 10' and receives blowdown gas from the rotary module 10' so as to allow the rotary module 10 to perform the PSA process previously described, except that the high pressure output of the compression machine 202 allows the PSA process to operate at high pressure and the rotor 11 to be operated at high speed. Further, as the compression machine 202 delivers gas to the pressurization compartments and receives gas from the blowdown compartments of the rotary module 10' at a plurality of substantially constant discrete pressure levels, the gas flow rate through the adsorbers remains substantially uniform. As a result, the efficiency of the PSA process and the volume of gas produced by the PSA process is increased improved.

For increased effective working capacity in superatmospheric pressure PSA cycles, preferably the adsorbent material is provided as laminated sheet adsorbers with metallic support material, such as those described with reference to FIG. 5, and the gas separation system 200 includes heaters (not shown) for heating the feed gas mixture or the blowdown gas for establishing a temperature gradient along the flow path in the laminated sheet adsorbers. Alternately, a temperature gradient may be established by employing intercoolers for cooling the feed gas mixture or the blowdown gas. These variations provide the benefits of augmented heat capacity to dampen thermal swings due to the heat effects of adsorption and desorption, and oflinearizing the axial thermal gradient by enhanced thermal conductivity along the flow path.

Turning to the issue of the preferred adsorbents for use with the gas separation system 200, it should be pointed out that recent conventional practice for oxygen separation from air has been to operate ambient temperature PSA at subatmospheric lower pressures in vacuum-PSA using Li—LSX, so that the highly selective adsorbents operate well below saturation in nitrogen uptake, and have a large working capacity in a relatively linear isotherm range. Further, it is known to use calcium and lithium cations in combination, and to substitute strontium for some or all of the calcium. Silver-exchanged zeolites are also known to have a high uptake and selectivity for nitrogen.

However, published ambient temperature isotherms for Ca—LSX, Sr—LSX, Ag—LSX, calcium chabazite and strontium chabazite show unfavourable nonlinearity compared to LSX variants which are highly exchanged with lithium, so that high vacuum would be needed for satisfactory regeneration after atmospheric nitrogen uptake. In fact, the calcium and strontium chabazites have such high uptake for nitrogen that their use at near-ambient temperature for bulk air separation would be completely infeasible owing to their close approach to saturation in nitrogen uptake except at excessively high vacuum. Consequently the highly lithium exchanged LSX adsorbents have been deemed to be superior.

On the other hand, at higher temperatures, saturation in nitrogen uptake is shifted to more elevated pressures, so the optimum PSA cycle higher and lower pressures are also shifted upward from vacuum towards positive pressure as temperature of the flow paths is increased. Further, at higher temperatures, isotherm nonlinearity is reduced. Therefore, as the high pressure output of the compression machine 202 forces the adsorbers to operate at moderately elevated temperature, preferably the adsorbers comprise strongly nitrogen-elective adsorbents such as Ca—X and Li—X, or their low 5 silica variants Ca—LSX and Li—LSX, or calcium chabazite zeolites. Alternately, Strontium-LSX or Strontium chabazite may be used if desired. Further, since the rotary module 10' encourages operation with small adsorbent inventories, adsorbent material such as Ag—LSX (or their combinations such as calcium/silver exchanged LSX) may also be used.

For satisfactory operation of the apparatus of FIG. 8, the typical operating temperature of the second ends of the adsorbers should be approximately 25° C. to 50° C. for Li—X or Li—SX, approximately 50° C. to 80° C. for Ca—X, Ca—LSX or Sr—LSX, approximately 50° C. to 100° C. for Ag—LSX, and approximately 100° C. to 150° C. for calcium chabazite or strontium chabazite.

Subject to stability issues, the lighter ions in each metal group of alkali or alkaline elements have stronger uptake for nitrogen, after exchange into hydrophilic zeolites and activation. Thus, preferably lithium is used as the alkali metal ion. However, magnesium exchanged chabazite is expected to have extremely strong uptake for nitrogen at ambient temperature, and thus may be used at temperatures above those appropriate for calcium chabazite.

FIG. 9

Figure 9:
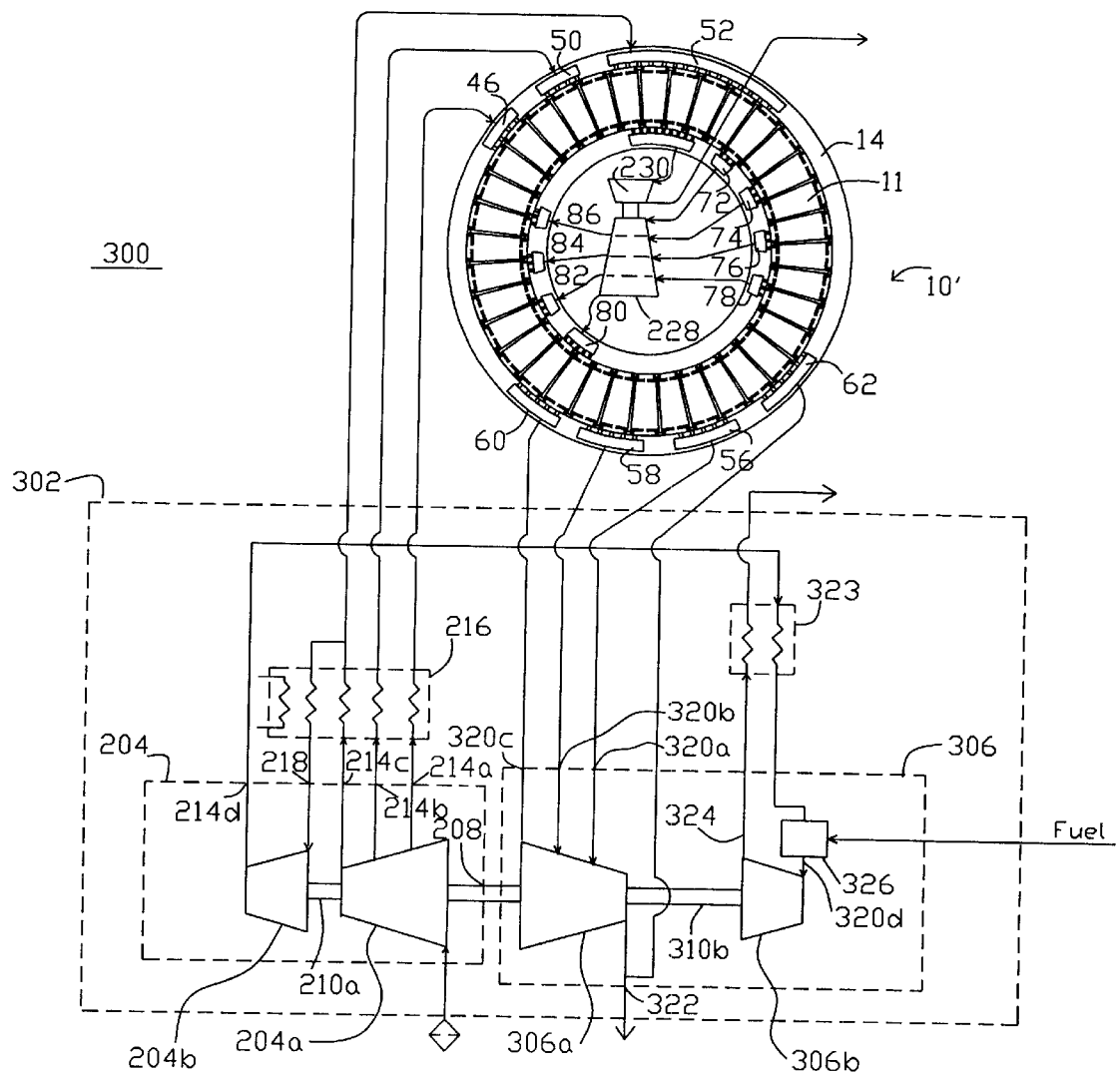
FIG. 9 is a schematic view of a second embodiment of the gas separation system, showing the axial or centrifugal multi-stage compressor and multi-stage vacuum pump of the compression machine.

A gas separation system 300, according to a second embodiment of the present invention, is shown in FIG. 9. The gas separation system 300 is similar to the gas separation system 200 in that it receives air at atmospheric pressure as the feed gas mixture, and employs nitrogen-selective zeolite adsorbents for extracting oxygen gas from the feed gas mixture as the light product gas and exhausting nitrogen-rich moist waste gas as the heavy product gas. However, unlike the gas separation system 200, the PSA lower pressure 152 of the gas separation system 300 is subatmospheric pressure.

The gas separation system 300 comprises the rotary module 10' and the light reflux expander 228 shown in FIGS. 1 to 4, and a compression machine 302 coupled to the rotary module 10' for exposing each of the adsorbent bed flow paths to a plurality of different pressure levels between the upper PSA pressure 151 and the lower PSA pressure 152 as the rotor 11 rotates. The compression machine 302 comprises a gas turbine, which in the embodiment shown in FIG. 9, includes the multi-stage compressor assembly 204, described in FIG. 8, and a multi-stage vacuum pump assembly 306 coupled to the first multi-stage compressor assembly 204 through a common shaft 208.

The multi-stage vacuum pump 306 comprises a vacuum pump 306a, and an expander 306b coupled to the vacuum pump 306a through the second auxiliary shaft 310b. The multi-stage vacuum pump 306a may comprise either an axial or centrifugal multi-stage vacuum pump. The vacuum pump 306a includes a plurality of pressure inlet ports 320 coupled to the countercurrent blowdown compartments 56, 58, 60 for receiving countercurrent blowdown gas from the flow paths at a plurality of different subatmospheric pressure levels, and a first gas outlet port 322 coupled to the blowdown compartment 62 for exhausting heavy product gas from the rotary module 10' at a pressure level intermediate the upper PSA pressure level 151 and the lower PSA pressure level 152.

Each of the pressure inlet ports 320 of the vacuum pump 306a are coupled to a respective one of the countercurrent blowdown compartments 56, 58, 60 with the countercurrent blowdown gas received at the first pressure inlet port 320a at a pressure level greater than the pressure level of the countercurrent blowdown gas received at the second pressure inlet port 320b, and the countercurrent blowdown gas received at the second pressure inlet port 320b at a pressure level greater than the pressure level of the countercurrent blowdown gas received at the third pressure inlet port 320c. As will be appreciated, the vacuum pump 306a may include a greater or fewer number of pressure inlet ports 320 than that shown in FIG. 9. Further, in one variation (not shown), the multi-stage vacuum pump 306 comprises a plurality of vacuum pumps, with each vacuum pump receiving the blowdown gas from a respective countercurrent blowdown compartment 62, 56, 58 at a respective blowdown gas pressure level.

The expander 306b includes a fourth pressure inlet port 320d coupled to the fourth pressure outlet port 214d of the second compressor 204b, and a second gas outlet port 324 which exhausts the feed gas received from the second compressor 204b after pressure letdown. The compression machine 302 also includes a heater 326 coupled between the fourth pressure outlet 214d of the multi-stage compressor assembly 204 and the fourth pressure inlet 320d of the multi-stage vacuum pump assembly 306 for increasing the pressure of the feed gas delivered to the fourth pressure inlet port 320d. Preferably, the heater 326 comprises a fuel combustor supplied by low cost fuel gas. However, the heater 326 may comprise an electrically-powered heater if desired. Alternately, or additionally as shown in FIG. 9, the compression machine 302 may include an electrically-powered heater 323 in addition to the fuel combustor 326.

The feed gas is received at the fourth pressure inlet port 320d at a pressure level greater than the pressure of the cocurrent blowdown gas received at the first pressure inlet port 320a. Accordingly, the feed gas is received at the fourth pressure inlet port 320d at the highest output pressure input to the multi-stage vacuum pump 306. However, the feed gas may be received at the fourth pressure inlet port 320d at a reduced pressure level if desired. Further, the vacuum pump 306a and the expander 306b may be integrated into a single multi-stage vacuum pump/expander without departing from the scope of the invention.

FIG. 10

Figure 10:
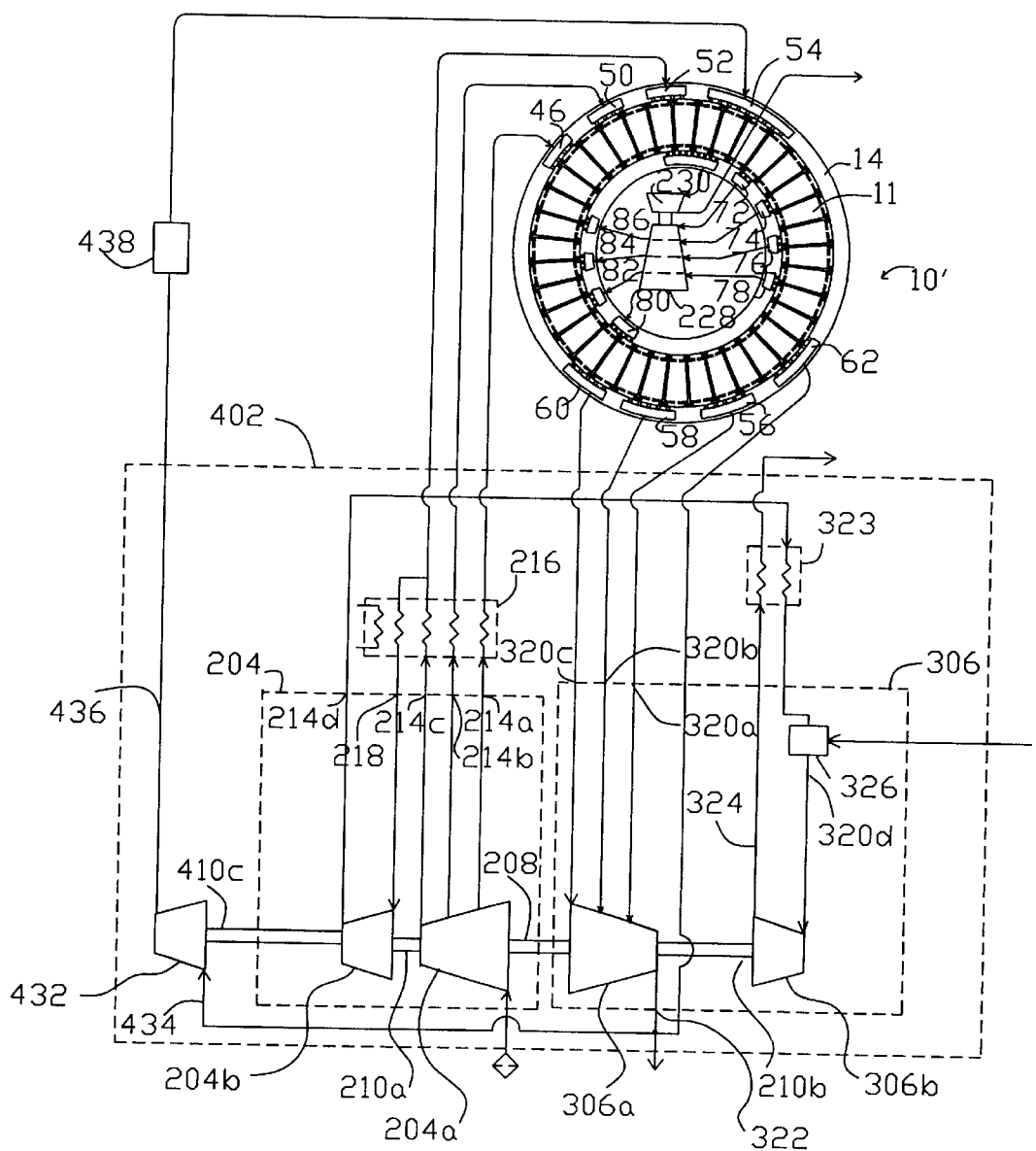
FIG. 10 is a schematic view of a third embodiment of the gas separation system, showing the axial or centrifugal multi-stage compressor, multi-stage vacuum pump and the heavy reflux compressor of the compression machine.

A gas separation system 400, according to a third embodiment of the present invention, is shown in FIG. 10. The gas separation system 400 is similar to the gas separation system 300 in that it receives air at atmospheric pressure as the feed gas mixture, and employs nitrogen-selective zeolite adsorbents for extracting oxygen gas from the feed gas mixture as the light product gas and exhausting nitrogen-rich moist waste gas as the heavy product gas. However, unlike the gas separation system 300, the gas separation system 400 includes a heavy reflux stage for increasing the purity of nitrogen in the heavy product gas stream.

The gas separation system 400 comprises the rotary module 10' and the light reflux expander 228 shown in FIGS. 1 to 4, and a compression machine 402 coupled to the rotary module 10' for exposing each of the adsorbent bed flow paths to a plurality of different pressure levels between the upper PSA pressure 151 and the lower PSA pressure 152 as the rotor 11 rotates. The compression machine 402 comprises a gas turbine, which in the embodiment shown in FIG. 10, includes the multi-stage compressor assembly 204, shown in FIG. 8, and the multi-stage vacuum pump assembly 306 shown in FIG. 9. However, unlike the embodiments described above, the compression machine 402 also includes a heavy reflux compressor 432 coupled to the vacuum pump 306a through a third auxiliary shaft 410c.

The heavy reflux compressor 432 includes a fifth pressure inlet port 434 coupled to the first gas outlet port 322 of the vacuum pump 306a for receiving a portion of the heavy product gas exhausted from the rotary module 10', and a third gas outlet port 436 coupled to pressurization compartment 54. The heavy product gas emanates from the third gas outlet port 436 at a pressure level greater than the pressure of the heavy product gas, and is returned to the rotary module 10' as heavy reflux return gas for increasing the purity of hydrogen gas in the heavy product gas. The gas separation system 400 also includes an air drier 438 disposed between the third gas outlet port 436 and the pressurization compartment 54 for preventing water vapour present in the heavy reflux return gas from entering the rotary module 10' and deactivating the adsorbent.

The foregoing description of the preferred embodiments of the invention is intended to be illustrative of the present invention. Those of ordinary skill will be able to envisage certain additions, deletions or modifications to the described embodiments without departing from the spirit or scope of the invention as defined by the appended claims.

We claim:

1. A pressure swing adsorption system for separating a first gas fraction and a second gas fraction from a gas mixture including the first and second fractions, the pressure swing adsorption system comprising:

a stator including a first stator valve surface, a second stator valve surface, a plurality of first function compartments opening into the first stator valve surface, and a plurality of second function compartments opening into the second stator valve surface, the first function compartments comprising a plurality of feed gas compartments and a plurality of countercurrent blowdown compartments;

a rotor rotatably coupled to the stator and including a first rotor valve surface in communication with the first stator valve surface, a second rotor valve surface in communication with the second stator valve surface, a plurality of flow paths for receiving adsorbent material therein, each said flow path including a pair of opposite ends, and a plurality of apertures provided in the rotor valve surfaces and in communication with the flow path ends and the function ports; and a gas turbine including a plurality of pressure outlet ports and a plurality of pressure inlet ports for maintaining each of the function ports at a plurality of discrete pressure levels between an upper pressure and a lower pressure for maintaining uniform gas flow through the first and second function compartments, wherein the gas turbine comprises a multi-stage first compressor coupled to the gas feed compartments through the pressure outlet ports for delivering feed gas to the flow paths at a plurality of pressure increments, a multi-stage first expander coupled to the first compressor and coupled to the countercurrent blowdown compartments through the pressure inlet ports for exhausting blowdown gas from the flow paths at a plurality of pressure increments, and a gas flow heater coupled to at least one of the pressure outlet ports for heating a portion of the feed gas and for conveying the heated portion to the first expander.

2. The pressure swing adsorption system according to claim 1, wherein the one pressure outlet delivers the feed gas portion at a highest output pressure of the first compressor.

3. The pressure swing adsorption system according to claim 1, wherein the first expander receives the heated gas portion at a highest pressure input of the first expander.

4. The pressure swing adsorption system according to claim 1, wherein the second function compartments include a plurality of cocurrent blowdown compartments for subjecting the flow paths to a plurality of incremental pressure drops, and a plurality of light reflux return compartments communicating with the cocurrent blowdown compartments for subjecting the flow paths to a plurality of incremental pressure increases, and the pressure swing adsorption system includes pressure let-down means coupled between the cocurrent blowdown compartments and the light reflux return compartments for delivering gas removed from the cocurrent blowdown compartments at reduced pressure to the light reflux return compartments.

5. The pressure swing adsorption system according to claim 4, wherein the second function compartments include a light product compartment, and the pressure let-down means comprises a second expander coupled to the cocurrent blowdown compartments and the light reflux return compartments, and a second compressor coupled to the light product compartment and to the second expander for boosting light product gas pressure.

6. The pressure swing adsorption system according to claim 5, wherein the pressure let-down means is disposed within the stator.

7. The pressure swing adsorption system according to claim 1, wherein the gas flow heater comprises a fuel combuster.

8. The pressure swing adsorption system according to claim 1, wherein the gas flow heater comprises an electric heater.

9. The pressure swing adsorption system according to claim 1, wherein the pressure inlet ports are coupled to the countercurrent blowdown compartments through a heater.

10. The pressure swing adsorption system according to claim 1, wherein the pressure outlet ports are coupled to the feed compartments through an intercooler.

11. The pressure swing adsorption system according to claim 1, wherein the adsorbent material is one of Li—X and Li—SX, operated within a temperature range of approximately 25° C. to 50° C.

12. The pressure swing adsorption system according to claim 1, wherein the adsorbent material is one of Ca—X, Ca—LSX and Sr—LSX, operated within a temperature range of approximately 50° C. to 80° C.

13. The pressure swing adsorption system according to claim 1, wherein the adsorbent material includes Ag—LSX, operated within a temperature range of approximately 50° C. to 100° C.

14. The pressure swing adsorption system according to claim 1, wherein the adsorbent material is one of calcium chabazite and strontium chabazite, operated within a temperature range of approximately 100° C. to 150° C.

15. A pressure swing adsorption system for separating a first gas fraction and a second gas fraction from a gas mixture including the first and second fractions, the pressure swing adsorption system comprising:

a stator including a first stator valve surface, a second stator valve surface, a plurality of first function compartments opening into the first stator valve surface, and a plurality of second function compartments opening into the second stator valve surface, the first function compartments comprising a plurality of feed gas compartments and a plurality of countercurrent blowdown compartments;

a rotor rotatably coupled to the stator and including a first rotor valve surface in communication with the first stator valve surface, a second rotor valve surface in communication with the second stator valve surface, a plurality of flow paths for receiving adsorbent material therein, each said flow path including a pair of opposite ends, and a plurality of apertures provided in the rotor valve surfaces and in communication with the flow path ends and the function ports; and a gas turbine including a multi-stage first compressor coupled to the gas feed compartments through the pressure outlet ports for delivering feed gas to the flow paths at a plurality of pressure increments, a multi-stage vacuum pump coupled to the compressor and coupled to the countercurrent blowdown compartments through the pressure inlet ports for receiving blowdown gas from the flow paths at a plurality of pressure increments, and a gas flow heater coupled to one of the pressure outlets for heating a portion of the feed gas and for conveying the heated gas portion to the vacuum pump.

16. The pressure swing adsorption system according to claim 15, wherein the one pressure outlet delivers the feed gas portion at a highest output pressure of the compressor.

17. The pressure swing adsorption system according to claim 15, wherein the vacuum pump receives the heated gas portion at a highest pressure input of the vacuum pump.

18. The pressure swing adsorption system according to claim 15 wherein the first function compartments include a heavy reflux return compartment communicating with at least one of the countercurrent blowdown compartments, and the gas turbine includes a reflux compressor coupled to the vacuum pump for delivering gas removed from the countercurrent blowdown compartments at increased pressure to the heavy reflux return compartments.

19. The pressure swing adsorption system according to claim 15, wherein the second function compartments include a plurality of cocurrent blowdown compartments for subjecting the flow paths to a plurality of incremental pressure drops, and a plurality of light reflux return compartments communicating with the cocurrent blowdown compartments for subjecting the flow paths to a plurality of incremental pressure increases, and the pressure swing adsorption system includes pressure let-down means coupled between the cocurrent blowdown compartments and the light reflux return compartments for delivering gas removed from the cocurrent blowdown compartments to the light reflux return compartments at reduced pressure.

20. The pressure swing adsorption system according to claim 19, wherein the second function compartments include a light product compartment, and the pressure letdown means comprises an expander coupled to the cocurrent blowdown compartments and the light reflux return compartments, and a second compressor coupled to the light product compartment and to the expander for boosting light product gas pressure.

21. The pressure swing adsorption system according to claim 20, wherein the pressure let-down means is disposed within the stator.

22. The pressure swing adsorption system according to claim 15, wherein the gas flow heater comprises a fuel combuster.

23. The pressure swing adsorption system according to claim 15, wherein the gas flow heater comprises an electric heater.

24. A gas separation system for separating a feed gas mixture comprising a first gas component and a second gas component, the gas separation system comprising:

an adsorbent bed assembly comprising a plurality of flow paths for receiving adsorbent material therein for preferentially adsorbing the first gas component in response to increasing pressure in the flow paths in comparison to the second gas component, each said flow path including a pair of opposite ends and a valve communicating with each said opposite end for controlling a flow of the feed gas mixture through the flow paths; and a gas turbine including a plurality of pressure outlet ports and a plurality of pressure inlet ports coupled to the valves for exposing each said flow path to a plurality of different pressure levels between an upper pressure and a lower pressure for separating the first gas component from the second gas component, wherein the gas turbine comprises a multi-stage first compressor coupled to the gas feed compartments through the pressure outlet ports for delivering feed gas to the flow paths at a plurality of pressure increments, a multi-stage first expander or a multi-stage vacuum pump coupled to the compressor and coupled to the countercurrent blowdown compartments through the pressure inlet ports for exhausting blowdown gas from the flow paths at a plurality of pressure increments, and a gas flow heater coupled to at least one of the pressure outlet ports for heating a portion of the feed gas and for conveying the heated portion to the first expander.

25. The gas separation system according to claim 24, wherein the one pressure outlet delivers the feed gas portion at a highest output pressure of the first compressor.

26. The gas separation system according to claim 24, wherein the first expander receives the heated gas portion at a highest pressure input of the first expander.

27. The gas separation system according to claim 24, further comprising pressure let-down means coupled to the valves for receiving flows of cocurrent blowdown gas from the flow paths at a plurality of pressure increments and for returning the received gas flows to the flow paths at reduced pressures as flows of light reflux return gas.

28. The gas separation system according to claim 27, wherein the pressure let-down means comprises a second expander, and a second compressor coupled to the second expander for boosting a pressure of gas delivered as light product gas.

29. The gas separation system according to claim 24, wherein the adsorbent material is one of Li—X and Li—SX, operated within a temperature range of approximately 25° C. to 50° C.

30. The gas separation system according to claim 24, wherein the adsorbent material is one of Ca—X, Ca—LSX and Sr—LSX, operated within a temperature range of approximately 50° C. to 80° C.

31. The gas separation system according to claim 24, wherein the adsorbent material includes Ag—LSX, operated within a temperature range of approximately 50° C. to 100° C.

32. The gas separation system according to claim 24, wherein the adsorbent material is one of calcium chabazite and strontium chabazite, operated within a temperature range of approximately 100° C. to 150° C.

33. A gas separation system for separating a feed gas mixture comprising a first gas component and a second gas component, the gas separation system comprising:

an adsorbent bed assembly comprising a plurality of flow paths for receiving adsorbent material therein for preferentially adsorbing the first gas component in response to increasing pressure in the flow paths in comparison to the second gas component, each said flow path including a pair of opposite ends and a valve communicating with each said opposite end for controlling a flow of the feed gas mixture through the flow paths; and a gas turbine including a plurality of pressure outlet ports and a plurality of pressure inlet ports coupled to the valves for exposing each said flow path to a plurality of different pressure levels between an upper pressure and a lower pressure for separating the first gas component from the second gas component, wherein the gas turbine comprises a multi-stage first compressor for delivering feed gas to the flow paths at a plurality of pressure increments, a multistage vacuum pump coupled to the compressor and coupled to the countercurrent blowdown compartments through the pressure inlet ports for extracting blowdown gas from the flow paths at a plurality of pressure increments, and a gas flow heater coupled to one of the pressure outlets for heating a portion of the feed gas and for conveying the heated portion to the vacuum pump.

34. The gas separation system according to claim 33, wherein the one pressure outlet delivers the feed gas portion at a highest output pressure of the first compressor.

35. The gas separation system according to claim 33, wherein the vacuum pump receives the heated gas portion at a highest pressure input of the vacuum pump.

36. The gas separation system according to claim 33, wherein the gas turbine includes a reflux compressor coupled to the vacuum pump for receiving a flow of countercurrent blowdown gas from the flow paths as countercurrent blowdown gas and for returning the received gas flow to the flow paths at increased pressure as a flow of countercurrent return gas.

37. The gas separation system according to claim 33, further comprising pressure let-down means coupled to the valves for receiving flows of cocurrent blowdown gas from the flow paths at a plurality of pressure increments and for returning the received gas flows to the flow paths at reduced pressures as flows of light reflux return gas.

38. The gas separation system according to claim 37, wherein the pressure let-down means comprises an expander, and a second compressor coupled to the expander for boosting a pressure of gas delivered as light product gas.

39. A gas turbine comprising:

a compressor having a speed of operation and including a compressor inlet port and a gas outlet for delivering gas received at the compressor inlet port under pressure to an external load;

an expander coupled to the compressor and including a gas inlet and an expander outlet port for exhausting gas received at the gas inlet; and a gas flow heater coupled to the gas outlet for heating a portion of the pressurized gas and for conveying the heated portion to the expander for increasing the speed of operation.

40. The gas turbine according to claim 39, wherein the gas outlet comprises a plurality of pressure outlet ports for delivering the gas received at the compressor inlet port at a plurality of outlet pressure levels.

41. The gas turbine according to claim 40, wherein the gas inlet comprises a plurality of pressure inlet ports for receiving the received gas at a plurality of inlet pressure levels.

42. A gas turbine comprising:

a compressor having a speed of operation and including a compressor inlet port and a gas outlet for delivering gas received at the compressor inlet port under pressure to an external load;

a vacuum pump coupled to the compressor and including a gas inlet and a pump outlet port for withdrawing gas through the gas inlet; and a gas flow heater coupled to the gas outlet for heating a portion of the pressurized gas and for conveying the heated portion to the pump for increasing the speed of operation.

43. The gas turbine according to claim 42, wherein the gas outlet comprises a plurality of pressure outlet ports for delivering the gas received at the compressor inlet port at a plurality of outlet pressure levels.

44. The gas turbine according to claim 43, wherein the gas inlet comprises a plurality of pressure inlet ports for receiving the withdrawn gas at a plurality of inlet pressure levels.

* * * * *